(12) United States Patent
Plaehn

(10) Patent No.: US 8,309,221 B2
(45) Date of Patent: Nov. 13, 2012

(54) REINFORCED FOAM PANEL

(76) Inventor: Jay Plaehn, Cle Elum, WA (US)

( * ) Notice: Subject to any disclaimer, the term of this patent is extended or adjusted under 35 U.S.C. 154(b) by 661 days.

(21) Appl. No.: 12/042,723

(22) Filed: Mar. 5, 2008

(65) Prior Publication Data
US 2009/0087656 A1 Apr. 2, 2009

Related U.S. Application Data

(60) Provisional application No. 60/976,700, filed on Oct. 1, 2007.

(51) Int. Cl.
*D02G 3/00* (2006.01)
(52) U.S. Cl. .................................................. 428/375
(58) Field of Classification Search .................. None
See application file for complete search history.

(56) References Cited

U.S. PATENT DOCUMENTS

| | | | |
|---|---|---|---|
| 4,091,153 A | | 5/1978 | Holman |
| 4,774,121 A | * | 9/1988 | Vollenweider, II ........... 428/117 |
| 4,810,551 A | | 3/1989 | Chu |
| 5,505,238 A | | 4/1996 | Fujii et al. |
| 5,543,197 A | | 8/1996 | Plaehn |
| 5,675,951 A | | 10/1997 | Gow |
| 5,738,924 A | | 4/1998 | Sing |
| 5,814,170 A | | 9/1998 | Shibusawa et al. |
| 5,916,105 A | | 6/1999 | Gow |
| 5,932,038 A | | 8/1999 | Bach et al. |
| 5,972,467 A | | 10/1999 | Washo |
| 5,976,644 A | | 11/1999 | Sanaee et al. |
| 6,010,585 A | | 1/2000 | Fujii et al. |
| 6,129,871 A | | 10/2000 | Suzuki et al. |
| 6,451,153 B1 | | 9/2002 | Symons |
| 6,576,331 B1 | | 6/2003 | Ryan |
| 6,841,231 B1 | | 1/2005 | Liang et al. |
| 7,147,745 B1 | | 12/2006 | Slaven, Jr. et al. |
| 7,160,053 B2 | | 1/2007 | Chang |
| 2003/0003828 A1 | | 1/2003 | Ellison et al. |
| 2004/0094875 A1 | | 5/2004 | Estrada et al. |
| 2005/0161852 A1 | | 7/2005 | Decker et al. |
| 2006/0022373 A1 | | 2/2006 | Ward |
| 2006/0127664 A1 | | 6/2006 | Geary et al. |
| 2006/0167164 A1 | | 7/2006 | Sugioka et al. |
| 2007/0009678 A1 | * | 1/2007 | Liao ................................. 428/5 |
| 2007/0122616 A1 | | 5/2007 | Lawson et al. |
| 2007/0125446 A1 | | 6/2007 | Pasha et al. |
| 2007/0187025 A1 | | 8/2007 | Slaven, Jr. et al. |

(Continued)

FOREIGN PATENT DOCUMENTS

CN 188542 * 1/2007

(Continued)

OTHER PUBLICATIONS

PCT International Search Report corresponding to International Application No. PCT/US08/11293 mailed Dec. 12, 2008.

(Continued)

*Primary Examiner* — Camie Thompson
(74) *Attorney, Agent, or Firm* — Husch Blackwell LLP

(57) ABSTRACT

A reinforced panel comprises at least two strength-providing strands and an insulating filler wherein the filler is situated around the strands such that a combination of the strands and the filler form a cohesive structure. Additionally, a ratio of the strength-providing strands to the filler is such that the panel is strong and rigid and is capable of providing insulation.

9 Claims, 4 Drawing Sheets

U.S. PATENT DOCUMENTS

| | | | | |
|---|---|---|---|---|
| 2009/0308528 | A1* | 12/2009 | Sullivan | 156/256 |
| 2009/0324876 | A1* | 12/2009 | Yang et al. | 428/99 |
| 2010/0028617 | A1* | 2/2010 | Plaehn | 428/182 |

FOREIGN PATENT DOCUMENTS

| | | |
|---|---|---|
| EP | 0 798 089 A1 | 10/1997 |
| JP | 2001-079807 | 3/2001 |
| WO | WO 97/49547 | 12/1997 |
| WO | WO 2005/035209 A2 | 4/2005 |
| WO | WO 2007/027405 A2 | 3/2007 |

OTHER PUBLICATIONS

Written Opinion of the International Searching Authority corresponding to International Application No. PCT/US08/11293 mailed Dec. 12, 2008.

Qisheng et al., Industrial Utilization on Bamboo, Technical Report No. 26, <http://www.inbar.int/publication/txt/tr26/INBAR_Technical Report>, Aug. 5, 2001.

Bai et al., Finite element analysis of Moso Bamboo-reinforced southern pine OSB composite beams, Soc Wood Sci Technol, Wood and Fiber Science, Oct. 1999, V 31, No. 4, p. 403-415. ISSN: 0735-6161. (Abstract).

Nugroho et al., Development of structural composite products made from bamboo I: fundamental properties of bamboo zephyr board. Springer Japan. Journal of Wood Science, Jan. 2000, v 46, No. 1, p. 68-74. ISSN: 1435-0211. (Abstract).

Nugroho et al., Development of structural composite products made from bamboo II: fundamental properties of laminated bamboo lumber. Springer Japan. Journal of Wood Science, May 2001, V 47, No. 3, p. 237-242. (Abstract).

Sumardi et al., Some important properties of strandboard manufactured from bamboo. Forest Products Journal, Jun. 2006, V 56, No. 6, p. 59-63. ISSN: 0015-7473. (Abstract).

Abdalla et al., Veneer strand flanged I-beam with MDF or particleboard as web material. J. Wood Science, vol. 50, No. 5, Oct. 2004. Abstract only. Retrieved online Dec. 5, 2007 from URL: http://www.springerlink.com/content/k1853573278m0365/ (Abstract).

Hindman et al., Use of Bamboo Strand Plywood in Box Beam Construction, American Society of Agricultural and Biological Engineers, 2005 Annual Meeting. Retrieved online Dec. 5, 2007 from URL: http://asae.frymulti.com/abstract.asp?aid=19513&t=2 (Abstract).

Nugroho et al., Selected Properties of full-sized bamboo reinforced composite beam, presented at the World Conference on Timber Engineering, Jul. 31-Aug. 3, 2000. Retrieved online Dec. 6, 2007 from URL: http://timber.ce.wsu.edu/Resources/papers/toc.pdf. pp. 1-8.

English translation of abstract of JP2001-079807, Mar. 27, 2001.

\* cited by examiner

REINFORCED FOAM PANEL

CROSS-REFERENCE TO RELATED APPLICATIONS

This application claims priority to U.S. Provisional Patent Application No. 60/976,700 filed Oct. 1, 2007 titled "Veneered Bamboo Strand Board Product."

FIELD OF THE INVENTION

The present invention relates generally to the field of insulated foam panels and more particularly to reinforcing foam with a strength-providing material so as to provide strength and rigidity to the foam.

BACKGROUND OF THE INVENTION

Certain types of foam can be used as an insulating material. However, although foam can provide superior insulating qualities, it does not have the strength and rigidity necessary to create building materials, for example, panels for roofs, walls and the like. Therefore, there is a need to combine an insulating foam with a material that will provide strength and rigidity to the foam so as to make it suitable to use as a building material.

Wood is generally cut from naturally grown trees. However, trees are limited in supply due to the length of time necessary for a tree to reach maturity. Additionally, the supply of natural wood is limited by the deforestation that is now occurring in many parts of the world. Accordingly, the price of wood has increased, especially in many parts of the world where there is not a large supply of wood. In many countries, people cannot afford to purchase wood to build shelter.

One approach to this problem has been to produce composite lumber formed of wood products, lignocellulosic materials, or reconsolidated wood products to make lumber products. Generally, producing composite lumber involves splitting, mashing, gluing, and manufacturing artificial wood from wood products to manufacture lumber products such as plywood, particle boards, and chip boards.

U.S. Pat. No. 4,810,551 filed Mar. 7, 1989 discloses a plywood made from sheets of bamboo. The sheets of bamboo are comprised of strands of bamboo glued together side by side and laminated. In one embodiment, each sheet of bamboo runs perpendicular to the one below or above it, creating the conventional plywood cross grain layering design. In an alternative embodiment, bamboo sheets are stacked on top of one another and glued together with the grain running in the same direction.

U.S. Pat. No. 5,543,197, which is hereby incorporated by reference, teaches the use of bamboo as a raw material to be used as the primary substance of an artificial wood beam. The bamboo strands are harvested, split open, and dried in long strips. The dried strips have adhesive applied evenly to them, are aligned in a parallel fashion, and are fused under pressure to create an artificial wood beam with qualities similar to that of naturally grown lumber.

There is a need to combine an insulating foam with a strength-providing material, such as wood or a wood substitute, in such a manner so as to provide insulating building materials for homes, buildings and the like. Additionally, there is a need for a wood substitute, which is less expensive than, more readily available than, and at least as strong as natural wood.

SUMMARY OF THE INVENTION

Accordingly, it is an object of the present invention to provide a building material that uses a strength-providing material in combination with an insulating filler, wherein the building material is less expensive to produce than traditional building materials, but has a similar appearance and possesses properties superior to traditional building materials.

It is a further object of the present invention to produce a product that utilizes the natural high tensile strength of bamboo for strength and rigidity of the building material.

It is another object to utilize a filler that provides superior insulating qualities.

It is still another object of the present invention to combine a strength-providing material and an insulating filler to produce a building material that can be used to construct shelters and the like.

Finally, it is an object of the present invention to provide a building material that uses a strength-providing material in combination with an insulating filler and can be manufactured to virtually any dimension.

In accordance with the present invention, all of these objects as well as others not herein specifically identified, are generally achieved by the present reinforced foam panel.

BRIEF DESCRIPTION OF THE DRAWINGS

Various examples of objects, features and attendant advantages of the present invention will become fully appreciated as the same becomes better understood when considered in conjunction with the accompanying drawings, wherein.

DETAILED DESCRIPTION OF THE INVENTION

Figure 1:
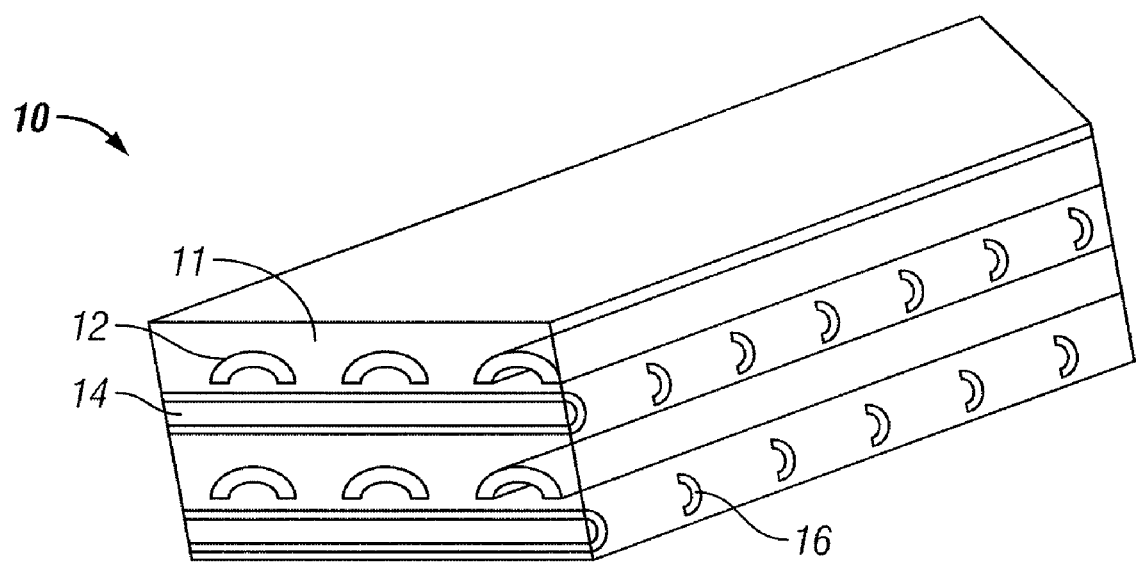
FIG. 1 is a perspective view of a reinforced foam panel.

While the present invention is susceptible to embodiments in various forms, there is shown in the drawings a number of presently preferred embodiments that are discussed in greater detail hereinafter. It should be understood that the present disclosure is to be considered as an exemplification of the present invention and is not intended to limit the invention to the specific embodiment illustrated. It should be further understood that the title of this section of the present application ("Detailed Description of the Invention") relates to a requirement of the United States Patent Office and should not be found to limit the subject matter disclosed herein.

Each of the patents cited herein is incorporated by reference. The use of the article "a" or "an" is intended to include one or more. The foregoing description is intended as illustrative and is not to be taken as limiting. Still other variations within the spirit and scope of this invention are possible and will readily present themselves to those skilled in the art.

FIG. 1 is a perspective view of a reinforced foam panel 10. The reinforced foam panel 10 can be used in reinforced foam panels, posts, boards, beams, or the like. In embodiments of the present invention, reinforced foam panels can be used, for example, to build insulated roofs and walls in shelters, homes, buildings, or the like.

The function of the strength-providing strands, for example 12, 14, 16, in the reinforced foam panel is similar to the function of steel rebar in cement. Rebar gives added strength to cement, which would otherwise be a relatively brittle material. Similarly, the reinforced foam panel uses the tensile strength of the strength-providing strands to provide added strength and rigidity to the foam in the reinforced foam panel. In a preferred embodiment, the reinforced foam panels can be used for roof and wall panels.

In preferred embodiments, the panels have dimensions such that the panels provide superior insulation and are simultaneously easy to work with. Further, the panels have a density ratio of strength-providing strands to filler such that the panels retain the superior strength and rigidity of the strands while providing the superior insulation of the filler. In preferred embodiments, the panels have a thickness from about 4 inches to about 6 inches.

In embodiments of the present invention the strength-providing strands can be made from wood, plastic, fiberglass, carbon fiber, or a wood substitute.

Embodiments of the present invention include bamboo as a wood substitute. The bamboo can be harvested, split open, and dried in long strands ranging from ¼ to ¾ inch in width to approximately 5 to 20 feet in length. The strands can be as short as 5 feet or less in small percentages. The dried strips can have adhesive applied evenly to them and they can be aligned with respect to one another. Adhesive applied to the bamboo strips can further enhance the ability of the bamboo to adhere to the filler in the reinforced panel.

Figure 2A:
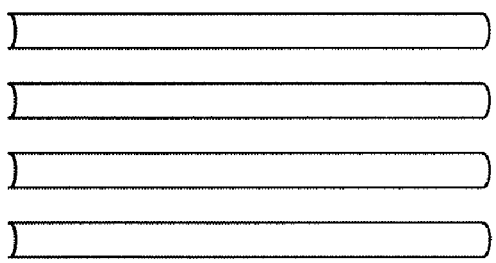
FIG. 2A shows a layer of strength-providing strands situated parallel to one another.
Figure 2B:
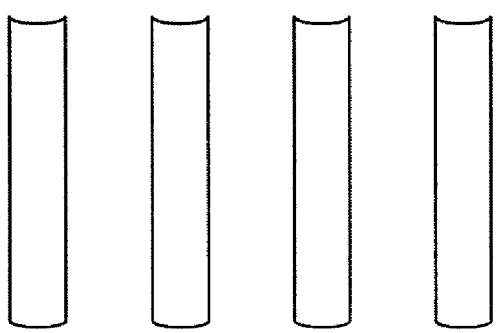
FIG. 2B shows a layer of strength-providing strands situated parallel to one another and in a direction that is perpendicular to the strands shown in FIG. 2A.

As seen in FIG. 1, the strength-providing strands can be situated in a matrix with a perpendicular pattern relative to one another; the perpendicular orientation of the strands results in increased strength of the panels. Specifically, as seen in FIG. 2A, various strength-providing strands are situated parallel to one another. As seen in FIG. 2B, additional strength-providing strands are situated parallel relative to one another. When included in the panel 10, the strands in FIG. 2A are placed above the strands of FIG. 2B such that the strength-providing strands form a perpendicular pattern relative to one another as seen in FIG. 1.

It is to be understood that the number of strength-providing strands included in each layer of the matrix situated parallel to one another is not a limitation of the present invention. Furthermore, the distance between the strength-providing strands within each layer and the distance between the layers are not limitations of the present invention. The number of strength-providing strands included within each layer situated parallel to one another, the distance between the strands within each layer, and the distance between each layer in the matrix must be such that the reinforced foam panel retains the strength and rigidity of the strength-providing strands.

Figure 3:
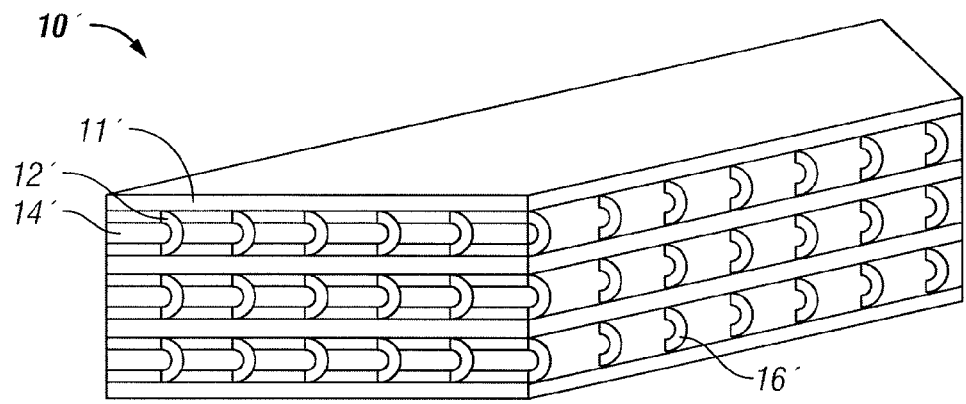
FIG. 3 is a perspective view of a reinforced foam panel wherein the strength-providing strands form a matrix with a criss-cross pattern.
Figure 4A:
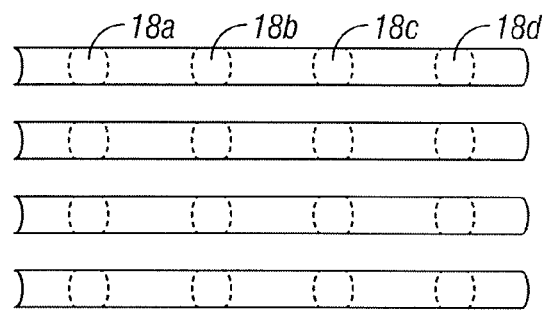
FIG. 4A shows a layer of strength providing strands with lateral holes therein situated parallel to one another.
Figure 4B:
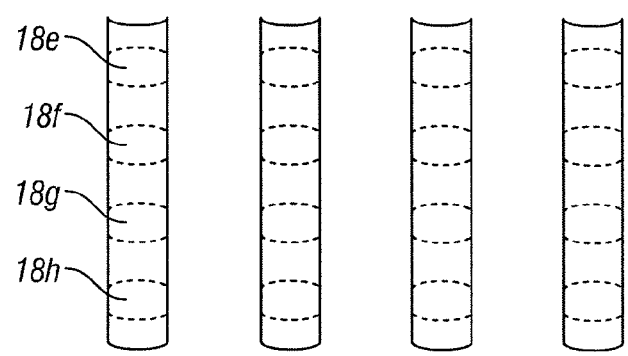
FIG. 4B shows a layer of strength-providing strands with lateral holes therein situated parallel to one another and in a direction that is perpendicular to the strands shown in FIG. 4A.

Alternately, the matrix may comprise strength-providing strands situated in a criss-cross pattern. FIG. 3 is a perspective view of a reinforced foam panel 10' wherein the strength-providing strands form a matrix with a criss-cross pattern. The strands can be seen, for example, at 12', 14', and 16'. As seen in FIG. 4A, various strength-providing strands are situated parallel to one another. As seen in FIG. 4B various strength-providing strands are situated parallel to one another. In this embodiment, the strands are made with lateral holes, for example, 18a, 18b, 18c, 18d, 18e, 18f, 18g, 18h that extend through the width of the strands. When included in the panel 10', the strands in FIG. 4A are placed perpendicular to the strands of FIG. 4B such that the strength-providing strands form a perpendicular pattern relative to one another, as seen in FIG. 3, and they also intersect one another by passing through the lateral holes. Thus, in this embodiment the strength-providing strands that are situated perpendicular to one another also lie in the same plane for further increased strength.

It is to be understood that neither the number of strength-providing strands included in each layer of strands situated parallel to one another nor the number of lateral holes within each strand are limitations of the present invention. Furthermore, the distance between the strands within each layer and the distance between the criss-crossed layers of strands are not limitations of the present invention. The number of strength-providing strands included within each layer situated parallel to one another, the number of lateral holes within each strand, the distance between the strands within each layer, and the distance between each criss-crossed layer must be such that the reinforced foam panel retains the strength and rigidity of the strength-providing strands.

In embodiments of the present invention, the strength-providing strands are textured. Textured strands provide for added strength in the reinforced foam panel. Textured strands also provide for a greater ability to adhere to the filler along the entire length of the strand. Furthermore, the textured strands increase the bond between the strands and the filler.

Figure 5:
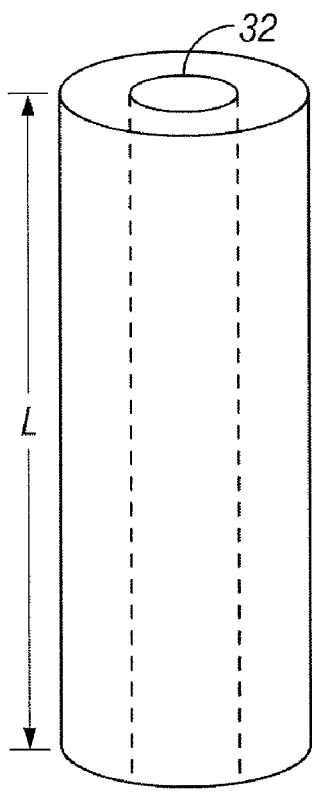
FIG. 5 shows a strength-providing strand with a hole pole situated therein.

Further embodiments of the present invention include hole poles, perforated poles, or perpendicular pegs. As seen in FIG. 5, a hole pole 32 can run in a parallel direction relative to the length L of the strength-providing strand and have a diameter less than the diameter of the bamboo strand. A hole pole can be filled with filler to provide for further added strength in the reinforced foam panel, to provide for an even greater ability to adhere to the filler, and to increase the bond between the strength-providing strand and the filler.

Figure 6:
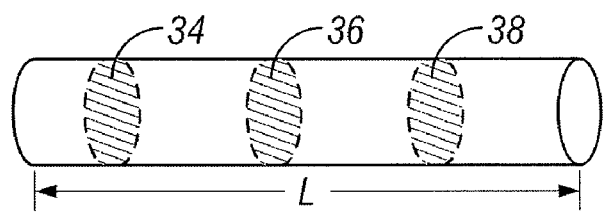
FIG. 6 shows a strength-providing strand with perforated holes situated therein.

As seen in FIG. 6, perforated holes 34, 36, 38 can be located along the length L of the strength-providing strand, but do not extend through the width of the strand. The perforated holes allow the strength-providing strands to have a greater ability to adhere to the filler. Additionally, the perforated holes increase the bond between the strands and the filler. Thus, the perforated holes provide for further added strength in the reinforced foam panel.

Figure 7:
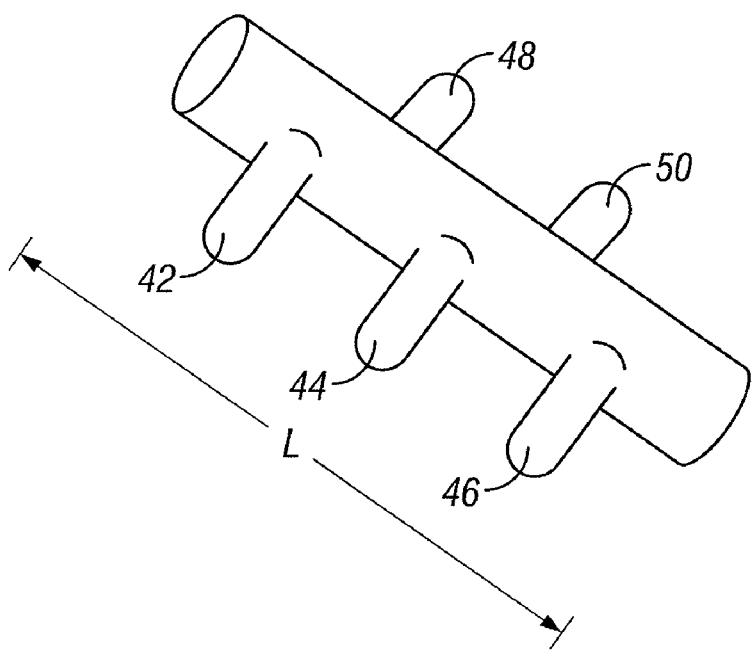
FIG. 7 shows a strength-providing strand with perpendicular pegs extending therefrom.

As see in FIG. 7, perpendicular pegs 42, 44, 46, 48, 50 can extend from the strength-providing strand in a perpendicular direction relative to the length L of the strand. The pegs can be constricted so as to extend through the width of the strength-providing strand and can extend from one or both sides of the strand. Further, the pegs can be rounded or squared. The perpendicular pegs provide for an even greater ability of the strength-providing strands to adhere to the filler and make the bond between the strands and the filler even stronger. Thus, the perpendicular pegs provide for further added strength in the reinforced foam panel.

The various embodiments of the strength-providing strands as described above use the natural tensile strength of the strands to provide for added strength in the reinforced foam panel. As discussed above, the strength-providing strand can be made from, for example, wood, plastic, fiberglass, carbon fiber, or a wood substitute such as bamboo.

Further embodiments of the present invention include a filler. As seen in FIGS. 1 and 3, the filler is 11 and 11', respectively. The filler should be thermally insulating and capable of filling the interstices of the matrix formed by the strength-providing strands. In a preferred embodiment, the filler may be a foam. Specifically, the foam may be a rigid, closed cell polyurethane foam. Such a foam is resistant to high temperature and is CFC free.

Typical physical properties of the foam in a preferred embodiment of the present invention include the following: For Components:

|  | Component A | Component B |
| --- | --- | --- |
| Viscosity, cps at 72° F. | 100-200 | 500 |
| Specific gravity, at 72° F. | 1.24 | 1.15 |
| Weight per gallon | 10.33 | 9.58 |
| Mix ratio | 50 | 50 |

For Cured Material:

|  | Test Method | Results |
| --- | --- | --- |
| Density | ASTM D-1622 | 2.4 |
| Thermal Conductivity | ASTM C-177 |  |
| Initial |  | 0.12 |
| Aged |  | 0.17 |
| Closed Cell, % Content | ASTM-D-2856 | 90 |
| Compressive Strength Parallel | ASTM D-1621 | 50 |

Typical reactivity data of the foam in a preferred embodiment of the present invention includes the following:

| | |
| --- | --- |
| Cream time, seconds at 74° F. | 40 +/− 5 |
| Rise time, seconds at 74° F. | 160 +/− 30 |
| Tack-free time, at 74° F. | 150 +/− 30 |

The reinforced foam panel can be made with the strength-providing strands and the filler as described herein. It is to be understood that the exact dimensions of the panels and the density ratio of strands to filler are not limitations of the present invention. Rather, the panels have dimensions such that they provide superior insulation and are simultaneously easy to work with. Further, the panels have a density ratio of strength-providing strands to filler such that the panels retain the superior strength and rigidity of the strands while providing the superior insulation of the filler.

Figure 8:
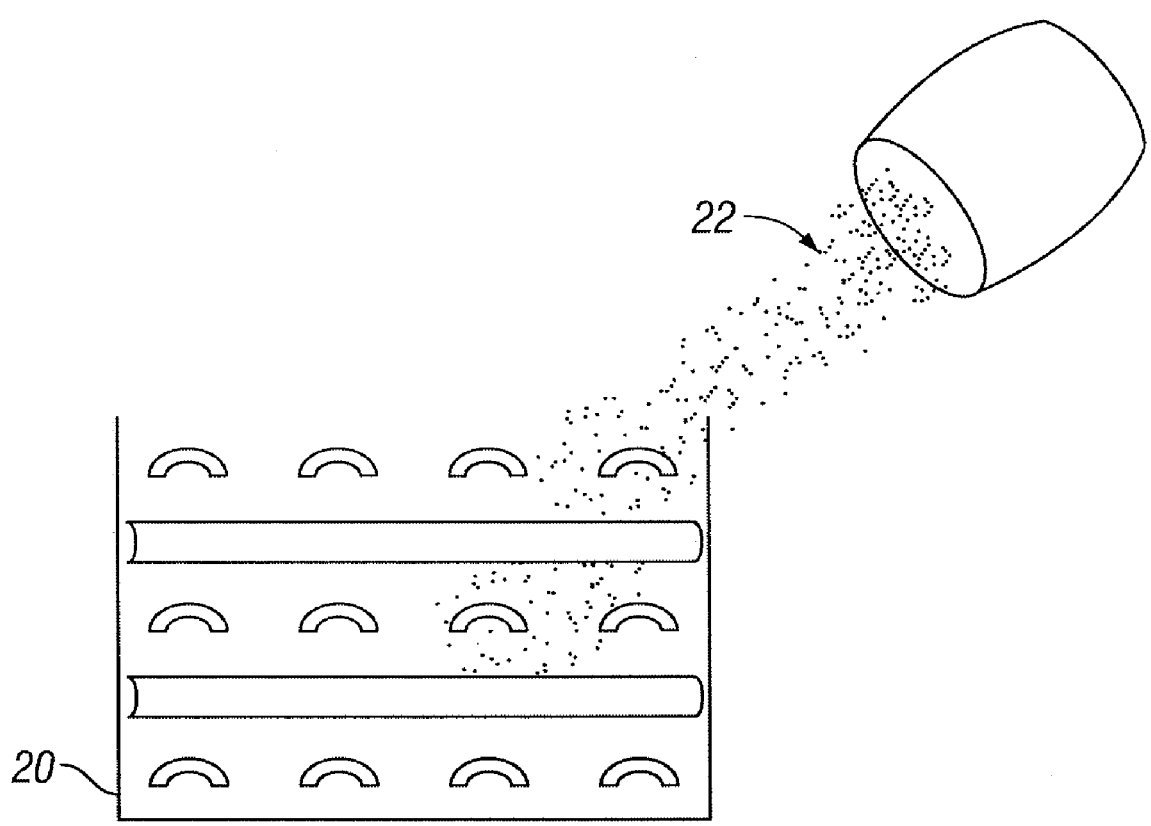
FIG. 8 shows a molding or chute in which strength-providing strands are placed and filler is poured in order to create a cohesive structure.

In a method of making a reinforced foam panel, the strength-providing strands, as described by the various embodiments herein, can be situated within a molding or a chute. FIG. 8 shows strands placed within a molding or chute 20 according to an embodiment of the invention in which the strands are situated perpendicular to one another. It is to be understood that the number of strength-providing strands and their spacing relative to one another are not limitations of the present invention.

Once the strands are placed, the filler 22, as described herein, can be poured into the molding or the chute 20. The strength-providing strands and the filler are fused together under pressure until a cohesive structure is formed.

In a preferred embodiment, the filler 22 is a polyurethane foam. Thus, the foam 22 expands to fill the empty space and crevices between the strength-providing strands and between the strands and the molding or chute 20. Once the cohesive structure is removed from the molding or chute 20, the foam 22 may continue to expand. Any excess foam is removed from the cohesive structure with, for example, a saw. The resulting cohesive structure is then milled into the desired dimensions.

What is claimed:

1. A reinforced panel comprising
   elongated spaced and split open bamboo strands arranged in at least a first layer of a plurality of bamboo strands and a second layer of a plurality of bamboo strands, the first layer of bamboo strands substantially perpendicular to and spaced from the second layer of bamboo strands; and
   an insulating filler comprising foam wherein the filler is situated around each of the bamboo strands such that a combination of the strands and the filler form a cohesive structure and a ratio of the strands to the filler is such that the panel is strong and rigid and provides insulation.

2. A reinforced panel as in claim 1 wherein the spaced and split open bamboo strands have at least one lateral hole therein.

3. A reinforced panel as in claim 1 wherein at least one of the bamboo strands is textured.

4. A reinforced panel as in claim 1 wherein at least one of the spaced and spit open bamboo strands contains a hole pole.

5. A reinforced panel as in claim 1 wherein at least one of the spaced and spit open bamboo strands contains a perforated hole along the length of the strand.

6. A reinforced panel as in claim 1 wherein at least one peg extends from at least one of the bamboo strands in a perpendicular direction relative to the length of the strand.

7. A reinforced panel as in claim 1 wherein the filler is a polyurethane foam.

8. A reinforced panel as in claim 1 wherein the panel uses the tensile strength of the strength-providing strands to provide strength and rigidity to the filler.

9. A reinforced panel comprising
   elongated, split open bamboo strands arranged in at least a first level of a plurality of said bamboo strands said bamboo strands of said first level being parallel and spaced from one another, and a second level of said bamboo strands, said bamboo stands of said second level being parallel and spaced from one another,
   the first level of bamboo strands substantially perpendicular to and spaced from the second level of bamboo strands; and
   an insulating filler comprising foam wherein the filler is situated around each of the bamboo strands such that a combination of the strands and the filler form a cohesive structure and a ratio of the strands to the filler is such that the panel is strong and rigid and provides insulation.

* * * * *